May 26, 1959  A. J. GRINER  2,887,964
ROTARY DOUGH-SHEET CUTTERS
Filed Aug. 3, 1956  8 Sheets-Sheet 1

INVENTOR.
ARTHUR J. GRINER
BY
ATTORNEY

May 26, 1959 A. J. GRINER 2,887,964
ROTARY DOUGH-SHEET CUTTERS
Filed Aug. 3, 1956 8 Sheets-Sheet 3

INVENTOR.
ARTHUR J. GRINER
BY
ATTORNEY

May 26, 1959 A. J. GRINER 2,887,964
ROTARY DOUGH-SHEET CUTTERS
Filed Aug. 3, 1956 8 Sheets-Sheet 4

INVENTOR.
ARTHUR J. GRINER
BY
ATTORNEY

May 26, 1959  A. J. GRINER  2,887,964
ROTARY DOUGH-SHEET CUTTERS
Filed Aug. 3, 1956  8 Sheets-Sheet 5

INVENTOR.
ARTHUR J. GRINER
BY
ATTORNEY

May 26, 1959 A. J. GRINER 2,887,964
ROTARY DOUGH-SHEET CUTTERS
Filed Aug. 3, 1956 8 Sheets-Sheet 6

INVENTOR.
ARTHUR J. GRINER
BY
*James E. Curtin*
ATTORNEY

United States Patent Office 2,887,964
Patented May 26, 1959

2,887,964

ROTARY DOUGH-SHEET CUTTERS

Arthur J. Griner, Westfield, N.J., assignor to National Biscuit Company, New York, N.Y., a corporation of New Jersey Application August 3, 1956, Serial No. 601,884

3 Claims. (Cl. 107—23)

This invention relates generally to cutting machines for biscuit doughs and the like, and particularly to machines wherein a continuously advancing sheet of dough is carried on a fabric apron beneath a reciprocating cutter or stamping die which cuts or outlines the dough into biscuit form, the dough sheet thus acted upon continuing to pass on from the apron to the steel or wire mesh belt of a so-called "band oven."

More specifically, the present invention contemplates a rotary biscuit cutting or stamping machine, i.e., a machine wherein the cutting or stamping die is in a form of a rotating cylinder as distinguished from the conventional reciprocating die. It is believed that the present invention for the first time makes it possible to form biscuit from sheeted dough by means of a rotary cutter or die.

At the outset, it should be noted that the rotary cutting machine of the present invention is quite different in principle, structure and operation from a rotary dough moulding machine, wherein the biscuit are formed by pressing soft, unsheeted dough into the moulding cavities of a cylindrical die and then removing the dough from the individual cavities. In dough moulding machines, there is no cutting or stamping of the biscuit from a moving sheet of dough and, hence, none of the problems attendant rotary cutting, which heretofore have not been satisfactorily overcome, are encountered in dough moulding.

It is the principal object of the present invention to provide a high speed rotary cutter which will continuously form biscuit in a moving dough sheet carried by a fabric belt or apron travelling beneath the cutter and keep the cut dough stripped from the cutter and in place on the belt so as to permit it to be continuously carried by and transferred directly from the belt onto a continuously moving steel band advancing through a band oven.

It is contemplated that the apparatus of the present invention will be permanently associated with the intake end of a band oven. In this respect, the apparatus is particularly adapted for mounting on a standard cutting machine base.

As already stated, present day machines for cutting dough sheets into biscuit form are principally of the reciprocating type, utilizing a heavy multi-cavity die which moves vertically and at the same time travels forwardly with the dough sheet for a short distance while acting upon it and then is lifted and its travel movement reversed rapidly while out of contact with the advancing dough sheet to a point where forward travel and contact with the dough sheet is again effected to make the successive cut or impression.

Machines of the reciprocating cutter type have been in existence for more than forty years, and they comprise heavy complicated structures, always subject in operation to an intermittent time loss because of their vertical and horizontal reciprocating movements. While they can be operated at speeds sufficient to meet the capacity of ovens in use at the present time, for example 38,000 pounds of a product like saltine crackers in an eight hour period of operation, their weight and mode of operation will necessarily place an upper limit on their speed of operation. If and when baking time is reduced by new heating methods, such as induction or high frequency thermo-electric heating, the oven speed can be increased and the high speed rotary cutter will already have been made available by the present invention.

Furthermore, periodic raising and lowering of the heavy cutting die creates a noisy and severe jarring effect on the entire machine, which tends to prevent the maintenance of accurate registration of the cutting die with the dough sheet and other necessary adjustments, and requires a great deal of maintenance and down-time, and needless to say, excessive wear and tear on the entire machine. With normal use of a conventional reciprocating biscuit cutting machine, there is always a concomitant wear of the cutting elements. Since the cutters are large multiple cavity dies, their replacement cost is high. All this, too, has a restrictive effect on the top speed at which a reciprocating cutter can be operated efficiently.

Obviously, the cause of the foregoing objections is completely eliminated by a smooth running rotary cutter, but in all of these years, there has been no practical solution to the problem of how to make a rotary cutter work satisfactorily until now. The difficulty has been to find a solution to the problem of preventing the dough sheet from rupturing or piling up, or both, caused primarily by its adherence to the cutting roller and thus being carried upward with the roller away from the moving belt on which it rests.

According to the present invention, a thin sheet of rolled biscuit dough is moved on a fabric belt between two metal rollers arranged in vertically spaced relation, the surface of the upper or cutting roller bearing raised cutting elements which conform to the outline of the biscuit to be cut. The entire surface of the lower roller on which the fabric belt travels is perforated to form a screen-like or closely foraminated cylindrical wall. Adequate pressure contact to force the cutting elements of the cutter roll partially into the dough sheet carried by the fabric belt is maintained at all times. In order to hold the dough sheet against the fabric belt and prevent it from sticking to the rotating cutting roller, a vacuum is effected through the perforated roller which will be communicated through the porous structure of the belt travelling over it, so that a suction effect will be applied to the dough sheet, serving to cause the entire sheet to cling to the fabric belt.

The hard sheeted doughs with which the present invention is particularly concerned are the "sponge" or fermented doughs used in making soda crackers, such as saltines, although the invention is not limited to use with fermented doughs. However, with a fermented dough, the biscuit must be pricked with what are known as "docker pins" which have several effects well known to those skilled in the art that may be generally said to affect the texture of the biscuit. Accordingly, provision is made for locating docker pins intermediate the cutting elements.

Also arranged in the biscuit forming areas defined by the cutting elements are pressure plates which have a limited movement, being constantly urged by spring pressure toward the periphery of the cutting roller. Thus, when the biscuit are being formed the plates are forced inwardly by the dough sheet against the spring pressure (leaving the docker pins to function when present) and as the cutting pressure is relieved the springs urge the plates outward, thus keeping them in constant contact with the dough. This action, in conjunction with the suction through the fabric belt, insures that the dough sheet will remain at all times, during and immediately after the cutting operation, in clinging contact with the fabric belt.

The cutting elements are formed so that they may be easily and economically replaced with a minimum of effort and loss of time and, in addition, to provide means which will permit the use of relatively low cost, replaceable elements in lieu of costly die-cast parts such as found in chased or engraved die rolls. To this end, and preferably, a fabricated cutting roller is provided, although, of course, the invention does not preclude the use of a die-cast roller with integrally formed cavities and cutting edges if expense is not to be considered.

Inasmuch as the rotary apparatus of the present invention is capable of extraordinarily high production, it may be necessary at times to change the cutter roll during a day's run, particularly when a change in variety of product is called for. In view of this, an important feature of the present invention is that the dismounting and replacement of the cutter roll is simplified and is far less time-consuming than the equivalent operation in conventional reciprocating cutter machines. Consequently, the "down-time" of the cutting apparatus, and of the band oven with which it is associated, will be substantially reduced.

Although the invention has been briefly set forth in the foregoing general description, many other objects and features thereof will be apparent from the detailed description to follow.

In the accompanying drawings, the invention has been shown merely by way of example and in preferred form and obviously many modifications and variations may be made therein, and in its mode of application, which will still be comprised within its spirit. It is to be understood therefore that the invention is not limited to any specific form or embodiment, except insofar as such limitations are specified in the appended claims.

Figure 1:
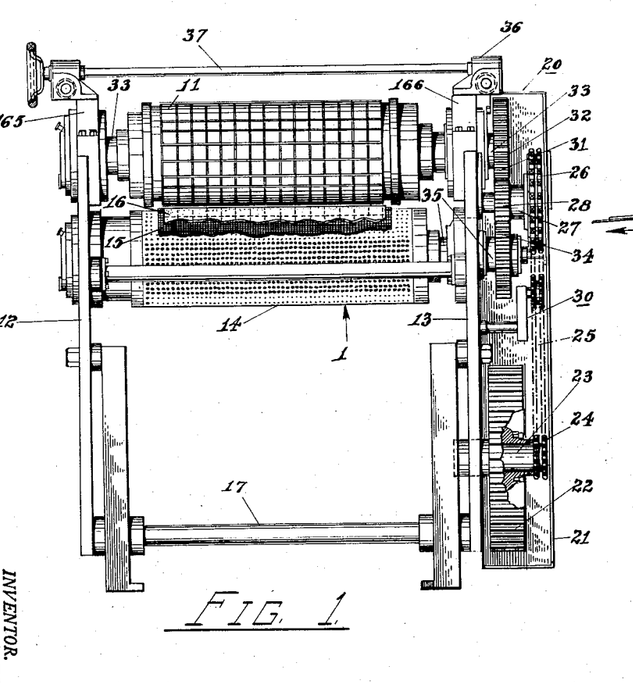
Fig. 1 is a front elevation of the apparatus, with the right hand gear case in section to show details of the sprocket and gear drive.
Figure 2:
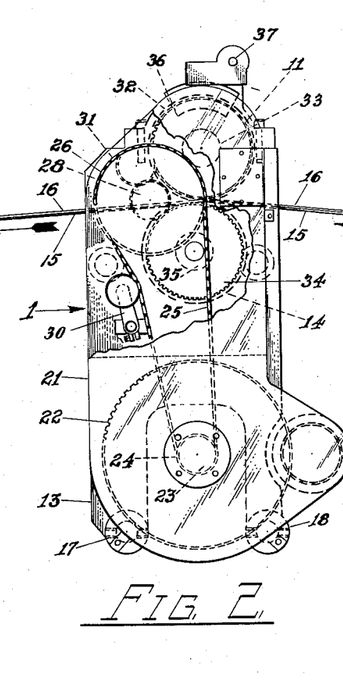
Fig. 2 is an end view of the apparatus shown in Fig. 1, with the gear case partly broken away to show details.

According to the illustrated embodiment of the invention, and with particular reference now to Figs. 1 and 2, there is shown a rotary biscuit cutter 1, provided with a continuously driven cutter roller 11, mounted for driven rotation between two side frame plates 12 and 13. Also mounted between the frame plates 12 and 13, directly below the roller 11, is a rotary vacuum cylinder 14 having a foraminated surface over which is passed an endless fabric apron or belt 15. The side frames 12 and 13 are suitably connected together by means which includes transverse members 17 and 18. A dough sheet 16 rests on the fabric belt 15, which advances the dough sheet towards the nip of the cutter roll 11 and the vacuum cylinder 14, at which point the dough sheet is drawn between the roller 11 and the cylinder 14.

In the form chosen for this disclosure the invention is embodied in an attachment type apparatus, which is adapted to be mouned on any appropriate base such as the base of a conventional biscuit cutting machine. It is to be understood, however, that the invention may be built as one integral unit including a dough sheet conveyor, cutter and flour duster, if desired.

Driving mechanism

The side frame plate 13 serves to support a sprocket and gear drive assembly 20 enclosed in a housing 21. A motor (not shown) is provided, the main shaft of which carries a pinion gear 19 in mesh with a drive gear 22 which is mounted for free rotation on a stub shaft 23 on the right-hand frame plate 13 (Figs. 1 and 2). A sprocket 24 is secured to the drive gear 22 and a drive chain 25 is passed around the sprocket 24 and around a driven sprocket 26. A stub shaft 27 is provided for rotatively mounting the driven sprocket 26 and a pinion 28, the latter being secured to the sprocket 26 for driven rotation. An idler unit 30 is provided to take up slack in the drive chain 25. In mesh with the pinion 28 is an intermediate pinion 31, which is mounted for free rotation on the side frame 13 and serves to drive a spur gear 32 fixed to a drive shaft 33. The shaft 33 is mounted for free rotation between the side frames 12 and 13 and serves as a drive for the cutter roll 11 which is fixed thereto.

Also in mesh with the pinion 28 is a spur gear 34 which is fixed to a drive shaft 35. The shaft 35 is mounted for free rotation between the side frames 12 and 13 and serves as a driving shaft for the lower vacuum cylinder 14, which is fixed thereto.

Referring now to Fig. 2, it will be seen that the large drive gear 22, if driven clockwise, will also carry its fixed sprocket 24 and the drive sprocket 26 clockwise. The pinion 28, fixed to sprocket 26, will be driven clockwise, turning the lower spur gear 34 and the vacuum cylinder 14 counterclockwise. Intermediate pinion 31 will be driven counterclockwise to rotate the spur gear 32 and its affixed cutter roller 11 clockwise. The ratios of the gear dimensions of the gear train drive for the cutter roller and the vacuum cylinder is such that their speed will be constantly equal, taking into consideration the thickness of the fabric belt 15 which passes over the vacuum roller 14.

*Cutter cylinder adjustment*

To accommodate various thicknesses of dough sheets and to locate the cutter roller 11 relative to the underlying fabric belt 15, suitable adjusting means 36 is provided (see Fig. 3 and Fig. 4) which comprises an adjusting or tightening shaft 37 extending through left and right-hand gear housings 38 and 40, respectively, each of which is cored and its walls axially bored to admit the shaft 37. A collar 29 and a collar 39 are secured to shaft 37 to prevent it from shifting axially. At each end of the shaft on the portions contained within the housings 38 and 40 there are secured helical gears 41 and 42 which mesh with helical gears 43 and 44. The last identified gears are mounted at right angles to their respective gears 41 and 42 and are keyed to shafts 45 and 46. The shafts 45 and 46 are mounted for free rotation within the housings 38 and 40 and worm gears 47 and 48, respectively, are keyed to the shafts 45 and 46.

Figure 3:
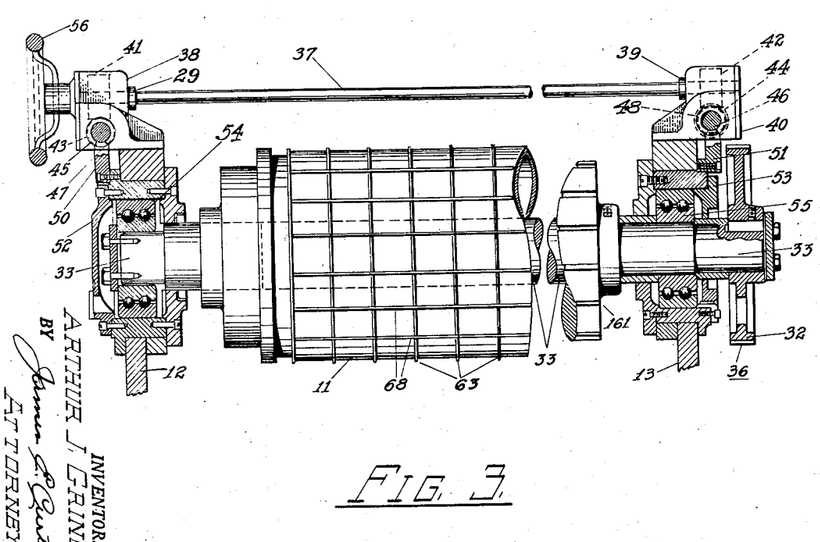
Fig. 3 is an elevation of the cutter roller, partly broken away, showing the mounting in transverse section.
Figure 4:
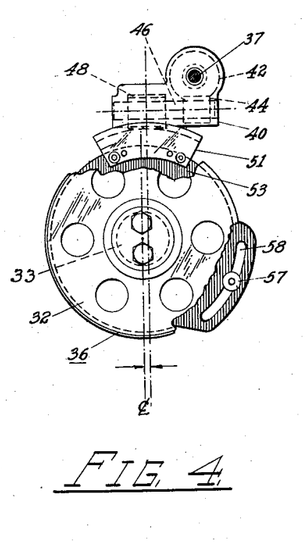
Fig. 4 is a right-hand end view of the cutter roller of Fig. 3, partially broken to show structural details.

Still referring to Figs. 3 and 4, it will be seen that worm gears 47 and 48 are in mesh with work wheel sectors 50 and 51, respectively, each sector of which is secured to a bearing plate consisting of circular discs 52 and 53, respectively. To enable the bearing plates 52 and 53 to shift the axis 33 of the cutter roller 11, bearings 54 and 55 for the shaft 33 are mounted eccentrically from the turning center of the bearing plates 52 and 53. A hand wheel 56 is secured to the left-hand end of the adjusting shaft 37, and when rotation of this shaft is effected the motion will be conveyed through the left and right-hand gear trains respectively, to sectors 50 and 51 to turn the bearing plates 52 and 53. The bearing plates 52 and 53 are mounted for free rotation in the side frame plates 12 and 13, respectively, and the eccentric mounting of the shaft 33 therein will effect a lateral movement of the shaft, shifting the center bearing assembly at each end of the shaft simultaneously and in parallel with one another so that the axis of the cutter roller 11 may be brought selectively closer to or farther away from the underlying fabric belt. In turning the hand wheel 56 to the right, the sectors 50 and 51 will be rotated counterclockwise as viewed in Fig. 4, which will lower the cutter roller 11, whereas a rotation of the handwheel 56 to the left will retract the cutter roller and widen the separation between it and the underlying belt 15. After the appropriate adjustment has been made, the cutter roller 11 may be locked in position by means of the locknut 57, which is secured to the side frame 13 and projects through a curved slot 58 formed in the bearing plate 53.

*The cutter roller*

Figure 10:
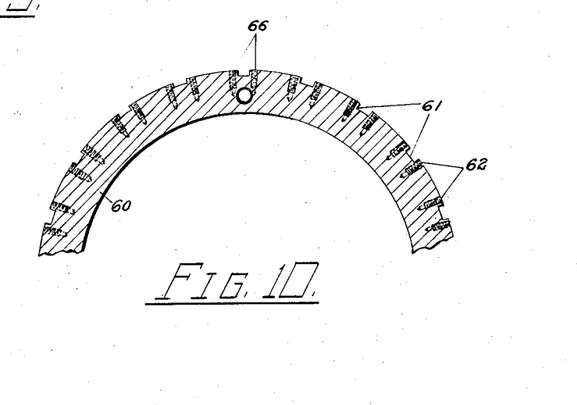
Fig. 10 is a cross-sectional view of a portion of the cutter roller wall, taken on a line X—X of Fig. 9.
Figure 11:
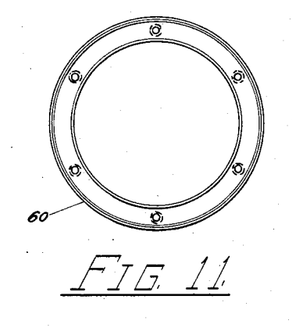
Fig. 11 is a right-hand end view of the cutter roller as shown in Fig. 9.

According to the present invention, the cutter roller 11 comprises a cylindrical steel casting 60 (Figs. 9, 10 and 11) which is machined to present a plurality of milled flats 61 equidistantly spaced about the periphery of the cylinder and extending longitudinally thereof.

Figures 12, 13, 14, 15, 16, 17, 18, 19:
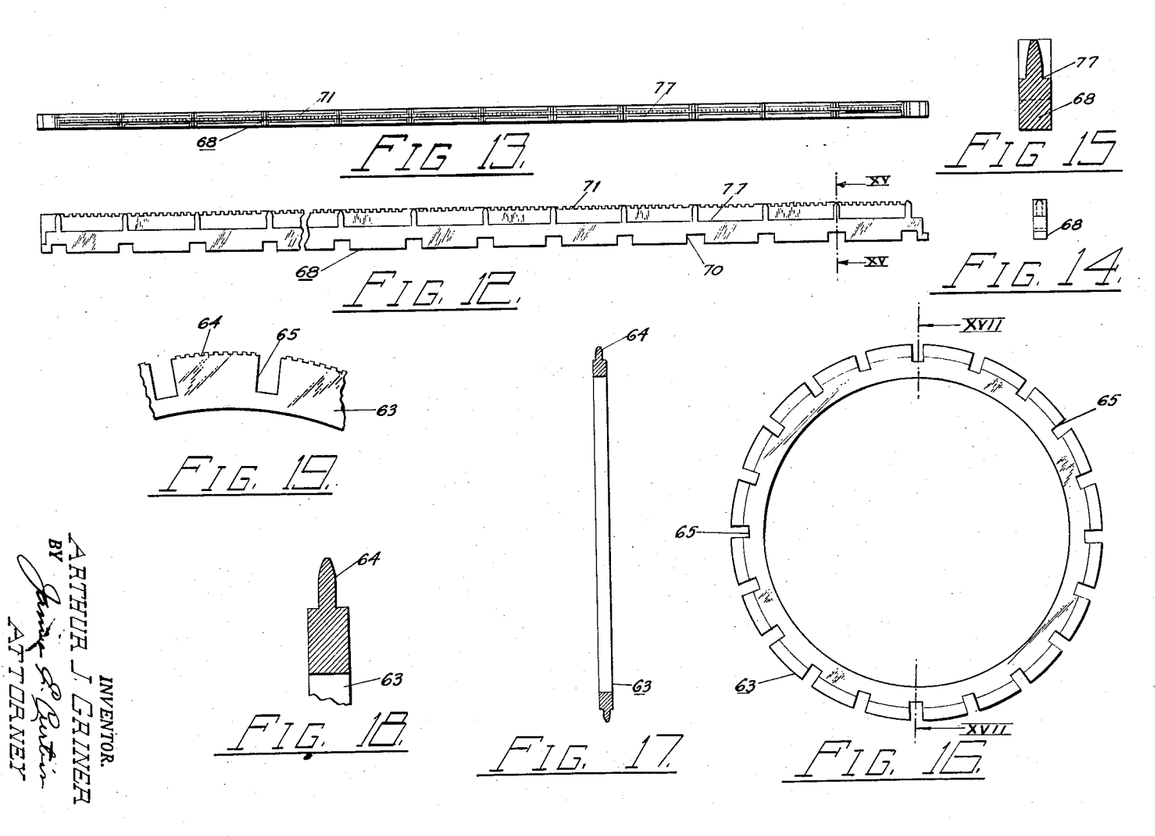
Fig. 12 is a side elevation of one of the cutter bars which forms a component part of the cutter roller assembly.
Fig. 13 is a plan view of the cutter bar of Fig. 12.
Fig. 14 is a right-hand end view of the cutter bar of Fig. 12.
Fig. 15 is an enlarged cross-sectional view of the cutter bar, taken on a line XV—XV of Fig. 12.
Fig. 16 is a plan view of one of the cutter rings which form a component part of the cutter roller assembly.
Fig. 17 is a sectional view of the cutter ring taken on a line XVII—XVII of Fig. 16.
Fig. 18 is an enlarged view of a sectional portion of the cutter ring as shown in Fig. 17.
Fig. 19 is an enlarged view of a portion of the cutter ring as shown in Fig. 16.

About the casting 60 there is mounted a series of hoop-like cutter rings 63 (Figs. 16, 17, 18 and 19) which are equally spaced axially of the casting as shown in Fig. 3. All of the cutter rings are preferably of steel and all, except the extreme right and left-hand rings, are provided with serrated cutting edges 64 (Fig. 19). The right and left-hand rings are not serrated in order that the more or less ragged edges of the dough sheet, which has been rolled down to the requisite thickness for cutting, may be trimmed off completely. This scrap which is removed from the edges of the dough sheet is returned to the hopper of unrolled dough to be used again. Each of the cutter rings 63, as shown in Fig. 16, is formed with equidistantly spaced recesses 65.

Figures 5, 6, 7, 8:
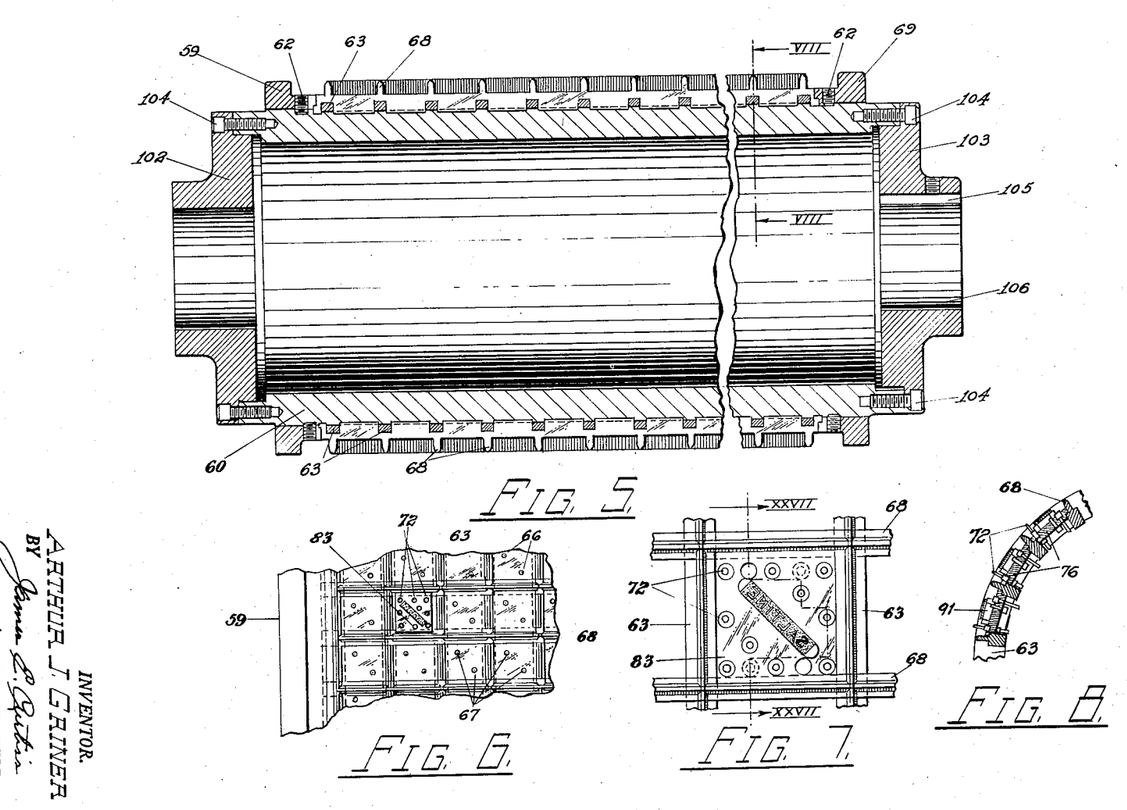
Fig. 5 is a longitudinal section of the cutter roller assembly which forms a part of the cutter roller of Figs. 3 and 4.
Fig. 6 is a plan view of a portion of the cutter roller assembly of Fig. 5, showing a docker-pin plate and block assembly secured to the roller.
Fig. 7 is an enlarged top view of one docker-pin plate assembly.
Fig. 8 is a cross-sectional view of a portion of the roller wall and its assembled components, taken on a line VIII—VIII of Fig. 5.
Figure 9:
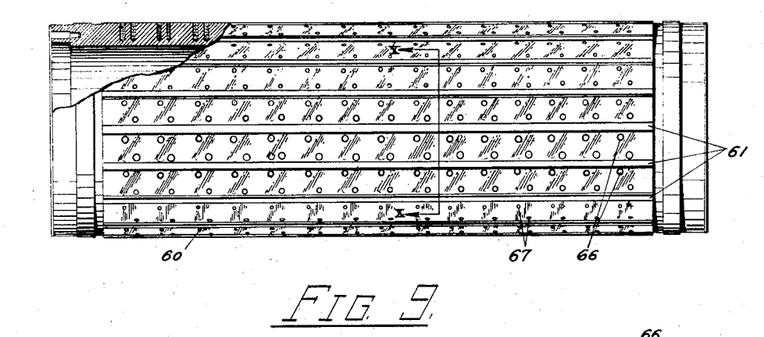
Fig. 9 is a front elevation of the cutter roller, partly broken away, before assembling the component parts thereto.

Referring to Fig. 9. It will be seen that the casting 60 is drilled and tapped to provide circumferential, equidistantly spaced holes 66. The holes 66 also form an arrangement 67 consisting of two diagonally-opposed holes 66, the purpose of which will be pointed out later. The cutter rings 63 are spaced equidistantly from each other on the casting 60 and each ring is arranged to lie midway between adjacent groups of circumferentially arranged holes 67 (see Fig. 5).

Referring to Figs. 12, 13, 14 and 15, there is shown a cutter bar 68, preferably of steel, and formed with a series of equidistantly-spaced notches 70. The casting 60 is provided with twenty of the cutter bars 68. These bars are formed in a manner which permits the notches 70 to be seated transversely in the recesses 65 of the cutter rings 63, which rings have previously been assembled on the casting 60 with the recesses 65 aligned axially of the casting. Thus, the longitudinal cutter bars 68 are united with the cutter rings 63 to form a rigid structure of rotatable cutting edges. In order to lock the rings 63 and bars 68 securely on the casting 60, two annular rings 59 and 69 (Fig. 5) are provided which are fastened by screws 62 to the casting.

It should be noted that the invention is shown in preferred form and may be practiced without the use of demountable cutting edges, the entire unit being cast with cutting edges formed integrally thereon.

As shown in Fig. 12, the cutter bars 68 are formed with serrated cutting edges 71 adapted to score the dough sheet in biscuit shape rather than to sever the sheet completely and form individual biscuit dough pieces (although the latter is within the scope and spirit of the invention). To this end, the cutter roll 11 is equipped with twenty longitudinal cutter bars, nineteen of which have serrated edges and the twentieth of which is provided with a non-serrated cutting edge. The purpose of this arrangement is to separate the continuous dough sheet into suitable lengths prior to its entry into the band oven, inasmuch as a continuous sheet of dough will buckle in the oven because of the fact that biscuit doughs shrink lengthwise during baking, but not crosswise to any serious extent. Consequently, a dangerous buckling effect would result if the dough sheet were not separated at appropriate points before entering the oven. In the embodiment shown, each revolution of the cutter roller will score twenty crosswise strips of biscuit, each strip comprising 15 individual biscuit in scored outline.

In the commercial baking of soda crackers and soda type biscuit, it is standard practice to pierce each blank of dough with docker pins, which prick or make small holes in the dough for the escape of steam which is generated therein during the baking operation and otherwise affect the dough to control the texture of the product.

Referring to Figs. 6, 7, 8 and 27 to 33 inclusive, a plurality of docker pins 72 are provided for each two-inch square cracker. The docker pins for each dough blank are arranged so that when the cutter roller is brought in contact with the sheet of dough, the docker pins will penetrate the upper surface of the dough while the cutter bars score the dough sheet into biscuit form. The docker pins are preferably of cold rolled-steel and are provided each with a shoulder 73 (Fig. 27) which is seated in a circular recess 74 concentric with a passage 75 bored through a docker block 76. The bore 75 is of a diameter sufficient to provide a drive fit for the docker pins 72 which are secured in the block 76 in such arrangement that their axis, in each case, is directed toward the central axis of the cylinder casting 60. Each block 76 is seated in the space formed between two cutter bars and two cutter rings (as in Fig. 7) on shoulders 77 formed on the cutter bars (Figs. 12, 13, 15 and 27). For this purpose, shoulders 78 are formed in the docker blocks 76 at an angle, the magnitude of which will permit the top surface of each block and its parallel undersurface to form a tangent with the periphery of the casting 60. For this purpose, all of the docker pin holes 75 formed in the block 76 (Fig. 28) are seen to be non-parallel inasmuch as they are centralized with the axis of the casting 60 in order that they will penetrate the dough perpendicularly. In assembling each block 76 to the casting 60, two Allen-head connectors 80 are seated in recesses 81 with their threaded stems screwed into two diagonally disposed tapped holes 66 in the casting 60.

Figure 27:
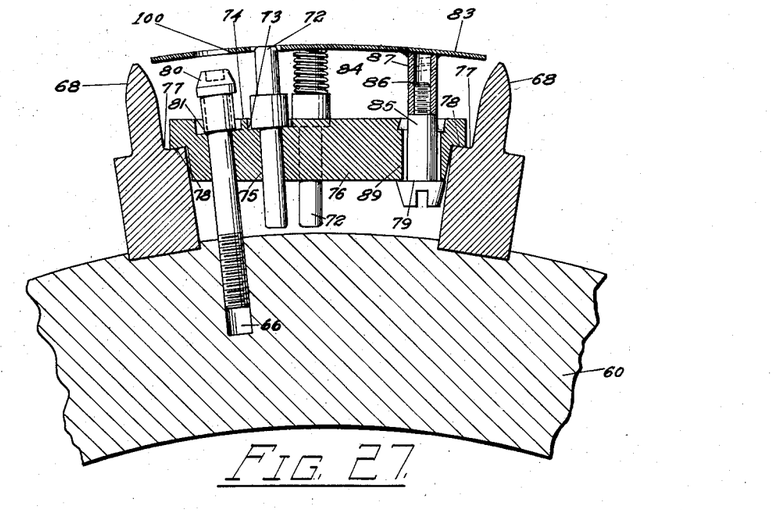
Fig. 27 is a sectional view of the cutter block assembly taken on a line XXVII—XXVII of Fig. 7.
Figures 28, 29, 30, 31, 32, 33:
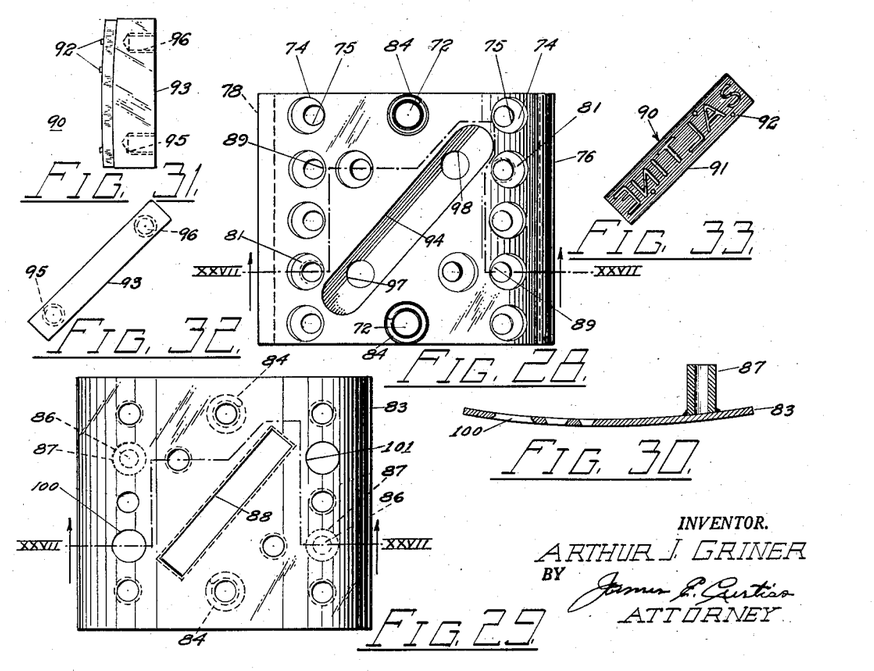
Fig. 28 is a top view of a docker block which forms part of the docker-pin assembly of Fig. 27.
Fig. 29 is a top view of a docker plate which is assembled to the docker block of Fig. 28.
Fig. 30 is a sectional view of the docker plate, taken on the line XXVII—XXVII of Fig. 29.
Fig. 31 is a side elevation of an embossing die assembly which is secured to the docker block of Fig. 28.
Fig. 32 is a top view of the embossing die block of Fig. 31.
Fig. 33 is a top view of the die plate which is secured to the block shown in Fig. 32.

As already stated, pressure plates are employed to operate in conjunction with the vacuum cylinder in causing the dough sheet to cling to the fabric belt 15. As shown in Figs. 27 and 28, the pressure plate 83 is yieldingly supported on coil springs 84, two of which are provided for each plate. Each spring is mounted on one of the docker pins 72 and, as indicated in Fig. 28, the docker pins chosen for this purpose are at opposite sides of the pressure plate, midway of the leading and trailing edges thereof. Thus, when brought into contact with the underlying dough sheet during rotation of the cutting roller, each pressure plate will yield substantially, and progressively fore and aft, under the cutting pressure. As the pressure is progressively relieved, the relaxation of the springs 84 will urge the pressure plate 83 outwardly from the docker blocks 76, thus maintaining the dough sheet in clinging contact with the apron 15.

The top surface of each pressure plate 83 (Figs. 29 and 30) is convex-shaped to coincide with the arcuate contour of the casting 60. Inasmuch as the upper ends of the coil springs 84 bear against the undersurface of the pressure plate 83 (Fig. 27), outward movement of the plate from the docker block 76 is limited by shoulders 79 of adjustable slide pins 85, two of which are provided for each plate. Each slide pin 85 is free to ride in its respective guide hole 89 which extends through the block 76. At its upper end, each pin 85 is formed with a threaded stud 86 which is engaged in an internally threaded sleeve 87 brazed to the undersurface of the pressure plate 83.

Fixed to the docker block 76 and movable within a slot 88 (Fig. 29) formed in the pressure plate 83 is an embossing die 90, which comprises a die plate 91 secured by rivets 92 to a die block 93 (Figs. 31, 32 and 33). To anchor the embossing die in the block 76 a recess 94 is formed in the block 76 and die block 93 and the block 76 are formed with drilled and tapped holes 95, 96, and 97, 98 to receive threaded connectors.

For the purpose of facilitating mounting or dismounting of the docker block on/or from the casting 60, each pressure plate 83 is provided with access openings 100 and 101 which permit a wrench or hand tool to be inserted into the Allen head sockets of the screws 80 in the underlying block 76.

A cast iron cap 102 and a similar cap 103 are secured at opposite sides of the cylinder 60 (Fig. 5) by means of bolts 104. A keyway 105 is cut in bearing 106 of the cap 103 to secure the casting assembly 60 to the drive shaft 33 (Fig. 3).

*Rotary vacuum cylinder*

Figures 20, 22:
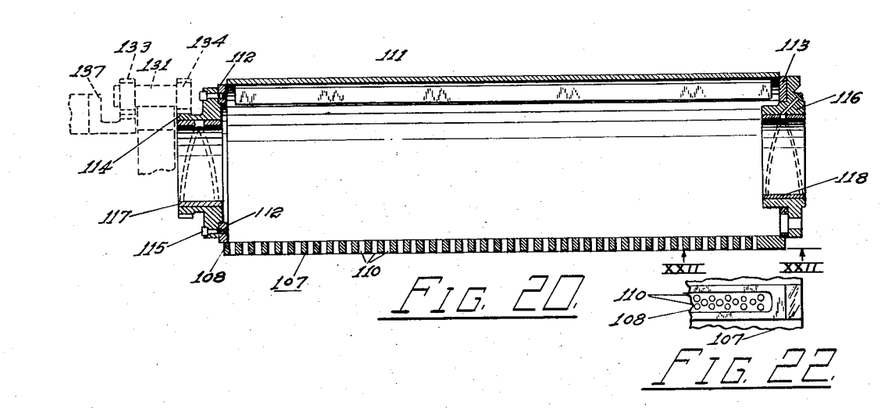
Fig. 20 is a longitudinal section of the inner drum of the vacuum cylinder assembly.
Fig. 22 is an enlarged view of a fragmentary portion of the vacuum cylinder wall when viewed in elevation.
Figure 21:
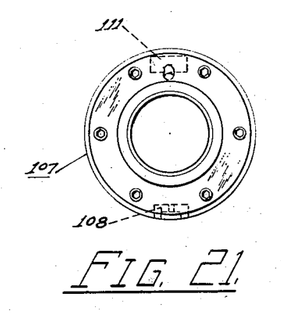
Fig. 21 is a right-hand end view of the cylinder assembly of Fig. 20.

Directly below the cutter roller 11 (Fig. 1) is the rotary vacuum cylinder 14 which comprises an inner drum 107 and an outer drum 120. In Fig. 20 there is shown a section of the hollow inner drum 107. The drum 107 in the present embodiment is formed from steel plate except for a narrow longitudinal strip 108 of cold rolled steel which is welded in position (Fig. 22). The strip 108 is perforated with a multiplicity of drilled holes 110 to form air passages from the inner drum 107 to an outer drum 120. In order to equalize the uneven distribution of weight in the inner drum caused by the perforated strip 108, which is of substantially heavier material than that of the drum 107, a counterbalance 111 is secured to the drum 107 diametrically opposite the strip 108. A flat steel spacer ring 112 of cold rolled steel is welded to the left-hand end of the drum 107 and a similar spacer ring 113 is welded to the right-hand end. A stationary ring gear 114 (Figs. 20 and 23) is secured to the left-hand spacer ring 112 with threaded bolts 115, and a cast iron bearing cap 116 is secured in similar manner to the right-hand end. Both the ring gear 114 and the end cap 116 are bored to seat press-fitted bushings 117 and 118, respectively, the internal diameters of which permit the assembled inner drum to be mounted for free rotation on the shaft 35.

Figures 23, 24, 25:
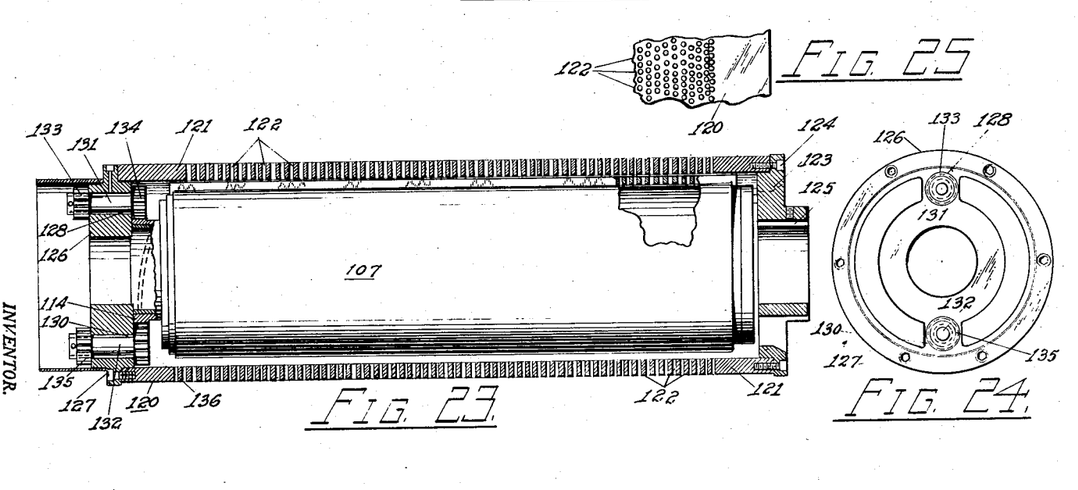
Fig. 23 is a longitudinal section of the vacuum cylinder assembly, showing the inner drum assembled concentrically within the outer drum.
Fig. 24 is a left-hand end view of the cylinder assembly shown in Fig. 23.
Fig. 25 is an enlarged view of a portion of the vacuum cylinder wall of Fig. 23 when viewed in elevation.

Referring to Fig. 23, which includes a sectional view of the outer perforated drum 120, the latter comprises a cylindrical shell 121 of cast steel closed at its opposite ends by caps 123 and 126. Substantially the entire surface of the shell 121 is foraminated by drilling or punching a multiplicity of small diameter holes 122 to provide air passages therethrough. The right-hand end cap 123 is secured to the shell 121 by bolts 124 and is centrally bored and provided with a keyway 125 for securing the drum 120 to the drive shaft 35 (Fig. 1). The left-hand end cap 126, as viewed in Fig. 23, is secured to the shell 121 by means of bolts 127. Before the end caps 123 and 126 are assembled to the shell 121, the inner drum 107 is mounted for free rotation on the drive shaft 35 and the outer drum 120 is then assembled about the inner drum 107 and secured to the drive shaft 35. As shown in Figs. 23 and 24, the end cap 126 is drilled and provided with brass bushings 128 and 130 for journaling pinion shafts 131 and 132. On the shaft 131 there is securely mounted for rotation a pinion gear 133 on the outside of the drum 120, while on the opposite end of the same shaft within the drum, there is similarly fixed to the shaft 131 a pinion gear 134. In like manner, there is mounted on the other pinion shaft 132 a pinion gear 135 on the outside of the drum 120 and a pinion gear 136 on the inside of the drum.

Referring to Fig. 20, it will be seen that the rotatable shaft 131 and its fixed pinions 133 and 134 are shown in dotted outline. The pinion 134 is shown in mesh with the stationary ring gear 114. Also, in Fig. 23, pinion 136 is shown in mesh with the stationary ring gear 114.

Figure 26:
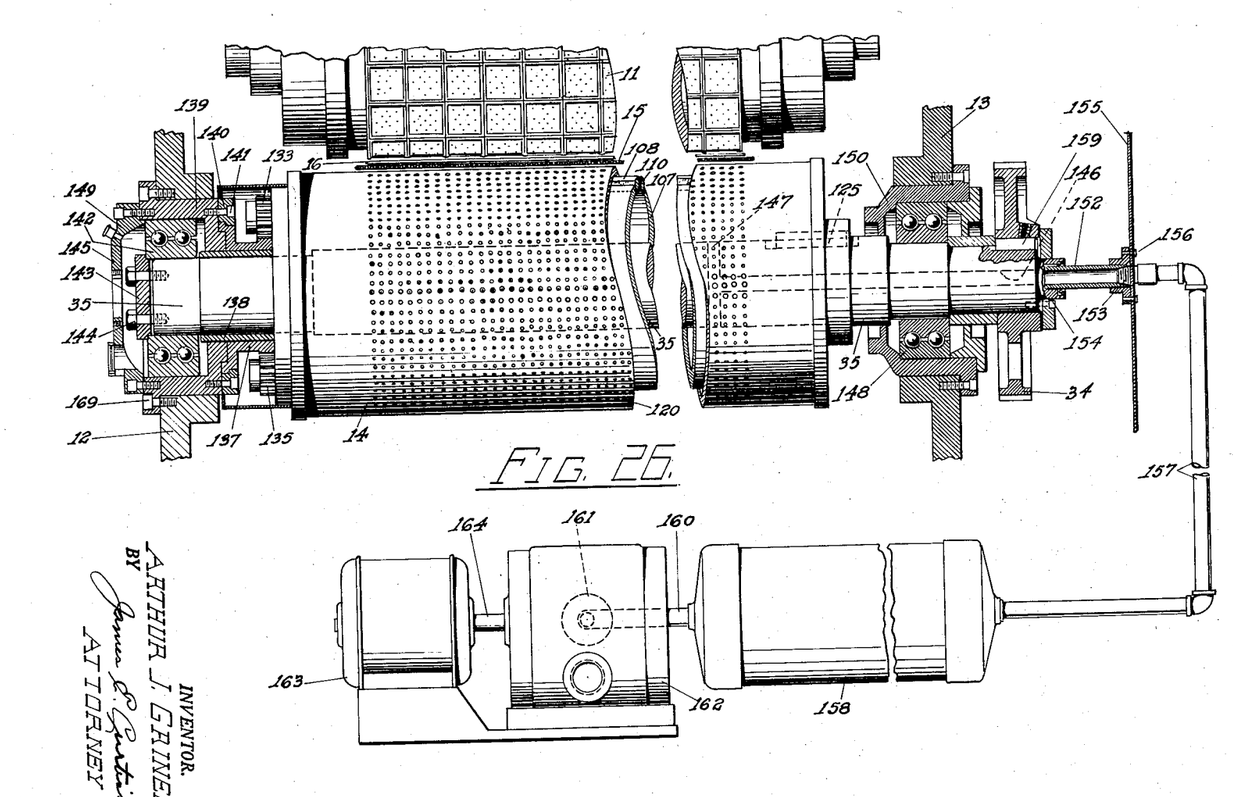
Fig. 26 is an elevation of the vacuum cylinder assembly, partially broken away to show structural details and partially in section to show details of the mounting assemblies.

With reference to Fig. 26, the pinions 133 and 135 are shown to be in mesh with an adjustable ring gear 137, which is mounted for free rotation on a sleeve 138 loosely fitted to the shaft 35. One face of the ring gear 137 is stepped to engage a complementary stepped ring clamp 140, which is fastened by bolts 141 to a housing 139 which contains a press-fitted bearing 142 for rotatable mounting of the drive shaft 35. A bearing cap 143 is secured by screws 144 to the end of the shaft 35, and a large housing cap 145 is secured to the housing 139 to retain the lubrication and exclude dust and grit. The housing 139 is secured to the frame 12 of the machine by means of bolts 169.

Inasmuch as the outer drum 120 is keyed to the drive shaft 35 (Fig. 26), it will be seen that rotation of the outer drum 120 can be effected without rotation of the inner drum, since the inner drum is mounted for free rotation on the shaft 35. The end cap 126 (Fig. 23), rotating with the drum 120, will cause the shafts 131 and 132 to be rotated about the ring gear 114 secured to the inner drum 107, and while the inner drum is loose on the shaft 35, the inertia of the drum will not be overcome by the planetary pinions 134 and 136, and as a consequence, the inner drum will remain stationary.

The shaft 35 (Fig. 26) is drilled axially to provide an air passage 146 leading from the right-hand end of the shaft through the center of the shaft for a substantial distance to a point where it intersects a transverse bore 147 in the shaft communicating with the interior of the inner drum 107. A bearing 148 is provided for the right-hand end support of the shaft 35 and is press-fitted into a housing 150 secured by bolts 151 to the frame 13. Fig. 26 shows the driven spur gear 34 secured by means of keyway 159 to the end of shaft 35.

A short length of pipe 152 connects the interior of the bored shaft 35 to a tapered pipe connection 153 (Fig. 26), a packing gland 154 enabling the hollow shaft 35 to revolve without leakage of air about the pipe 152, and the pipe being supported by a collar fixed by means of screws 156 to a housing wall 155. The pipe 152 communicates through an installation of standard piping 157 with a vacuum tank 158. Air is continually exhausted from the tank 158 through a pipe connection 160 leading to the inlet port 161 of a suction blower 162. Power is supplied from any convenient source, such as a motor 163, to a shaft 164 which drives the exhaust blower 162.

A powerful and constant vacuum is thus maintained in the vacuum tank 158, which communicates through the piping described and the bores 146 and 147 with the interior of the inner drum 107. The suction entrains air through the openings 110 in the longitudinal strip 108 of the inner drum 107. The strip 108 makes face contact with the inner surface of the perforated outer drum 120 and the suction through the openings 110 in turn entrains air through the perforated wall of the outer drum 120 in the area in which the strip 108 is located.

The strip 108 is adjusted by means of the clamp ring 140 (Fig. 26), which may be loosened to rotate the ring gear 137 by hand, whereby the pinion 133, the shaft 131, and the pinion 134 are correspondingly rotated and in turn rotate the ring gear 114, thus rocking the inner drum 107 so as to locate the strip 108 in the most efficient working position. The suction as just described operates through the overlying porous fabric belt 15 and draws upon the scored dough sheet to hold it against the belt as it is carried away from cutting position beneath the cutter roller 11.

To facilitate the mounting and demounting of the cutter roller 11 when required, split journals (not shown) are provided and are housed by bearing caps 165 and 166 (Fig. 1).

Having thus described my invention, what I claim is:

1. In a rotary biscuit cutter apparatus, the combination of a cutter roller having peripherally disposed cutting edges, means for continuously moving a sheet of dough in a path to be engaged and acted upon by the cutting edges of said cutter roller, said moving means comprising a support roller disposed in spaced-apart vertical alignment with said cutter roller and an endless porous belt traveling over said support roller and supporting the dough sheet for engagement by the cutting edges of the cutter roller, said support roller including an outer cylindrical drum, the wall of which is substantially perforated throughout its peripheral surface, a drive shaft on which the support roller is concentrically mounted equipped with means for rotating it, means for creating air suction, a rotatable but normally stationary inner vacuum drum concentrically mounted within said outer rotating drum with its peripheral surface in sliding contact with the inner surface of the outer drum, means connecting the interior of the inner drum for communication with said air suction means, said inner drum having a longitudinal row of perforations in the area directly beneath said cutter roller, whereby air suction may be exerted on the dough sheet through the outer rotating drum and porous belt, and planetary gear driving means for rotating said outer drum while the inner rotatable drum remains stationary.

2. A rotary biscuit cutter according to claim 1, wherein said planetary gear driving means between the outer and inner drum comprises a pair of idling gears and a sun gear in mesh therewith, said sun gear being fixed at one end of the inner drum, the rotation of said outer drum effecting a planetation of the idling gears about said sun gear, the weight of the inner drum possessing sufficient inertia to resist rotation by said idling gears.

3. A rotary biscuit cutter according to claim 1, wherein said planetary gear driving means between the outer and inner drum comprises a pair of idling gears and a sun gear in mesh therewith, said sun gear being fixed at one end of the inner drum, the rotation of said outer drum effecting a planetation of the idling gearing about said sun gear, said sun gear normally remaining substantially stationary but being rotatable to locate said inner drum in effective position relative to said outer drum, whereby said row of perforations in said inner drum may be set in its maximum dough sheet holding position.

References Cited in the file of this patent

UNITED STATES PATENTS

| | J. and C. Bruce | Mar. 13, 1832 |
|---|---|---|
| 475,607 | Peterson | May 24, 1892 |
| 641,724 | Peters | Jan. 23, 1900 |
| 642,220 | Green | Jan. 30, 1900 |
| 705,041 | Copland | July 22, 1902 |
| 807,420 | Copland | Dec. 12, 1905 |
| 2,007,768 | Olevin | July 9, 1935 |
| 2,144,720 | Gibson | Jan. 24, 1939 |
| 2,163,878 | Hornung | June 27, 1939 |
| 2,263,854 | Spang | Nov. 25, 1941 |
| 2,446,201 | Turner | Aug. 3, 1948 |